US009507655B2

(12) United States Patent
Puvvada et al.

(10) Patent No.: US 9,507,655 B2
(45) Date of Patent: Nov. 29, 2016

(54) TRACKING ASYNCHRONOUS ENTRY POINTS FOR AN APPLICATION

(71) Applicant: AppDynamics, Inc., San Francisco, CA (US)

(72) Inventors: Suraj Puvvada, San Jose, CA (US); Ryan Ericson, San Francisco, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/530,443

(22) Filed: Oct. 31, 2014

(65) Prior Publication Data

US 2016/0124783 A1   May 5, 2016

(51) Int. Cl.
*G06F 3/00* (2006.01)
*G06F 9/54* (2006.01)
*G06F 9/46* (2006.01)

(52) U.S. Cl.
CPC .............. *G06F 9/547* (2013.01); *G06F 9/466* (2013.01); *G06F 9/54* (2013.01)

(58) Field of Classification Search
CPC ........................................................ G06F 9/54
USPC ........................................................ 719/328
See application file for complete search history.

(56) References Cited

U.S. PATENT DOCUMENTS

| 8,074,207 B1* | 12/2011 | Reilly | G06F 11/3476 717/130 |
| 2005/0027761 A1* | 2/2005 | Wu | G06F 12/0261 |
| 2008/0201716 A1* | 8/2008 | Du | G06F 9/30145 718/104 |
| 2012/0110554 A1* | 5/2012 | Bates | G06F 11/362 717/129 |
| 2012/0304172 A1* | 11/2012 | Greifeneder | G06F 9/45504 718/1 |

OTHER PUBLICATIONS

Sameer Shende, Dynamic Performance Callstack Sampling: Merging TAU and DAGV, 1998.*
U.S. Appl. No. 14/701,414, filed Apr. 30, 2015, Michael Margoolis, Agent Asynchronous Transaction Monitor.
U.S. Appl. No. 14/701,418, filed Apr. 30, 2015, Sanjay Nagaraj, Asynchronous Custom Exit Points.
U.S. Appl. No. 14/530,564, filed Oct. 31, 2014, Wiliam D. Pijewski, Asynchronous Processing Time Metrics.

* cited by examiner

*Primary Examiner* — Lechi Truong
(74) *Attorney, Agent, or Firm* — Bachmann Law Group

(57) ABSTRACT

Asynchronous operations associated with a request such as synchronous threads, runnable elements, callable elements, and other invokable objects are tracked to determine the metrics about the request and operations. The present technology tracks the start and end of each asynchronous operation and maintains a counter which tracks the currently executing asynchronous operations. By monitoring the request, the start and end of each asynchronous operation associated with the request, and the number of asynchronous operations currently executing, the present technology may identify the end of a request by identifying when the last asynchronous operation associated with the request ends. In some instances, the present technology identifies the end of a request when a counter which tracks the number of asynchronous operations executing reaches a value of zero after the first asynchronous operation has already begun.

18 Claims, 5 Drawing Sheets

TRACKING ASYNCHRONOUS ENTRY POINTS FOR AN APPLICATION

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Some applications begin and end on a single thread. Single threaded requests are relatively straightforward to monitor. Some requests, however, do not start and end on a single thread, but rather begin on a first segment and end on an asynchronous second segment. Because the segments are often not linked together, it can be very difficult to monitor the start and end of the asynchronous threads as a single process.

What is needed is an improved method to monitor transactions involving separate asynchronous threads that are not linked.

SUMMARY

The present technology is able to discover and track business transactions that have two asynchronous segments. The segments may include a begin segment and an end segment and may execute on different threads of execution. A context object is used to determine an end segment for a start segment. A call element may be inserted into call graph to tie the call graph for the first segment and second segment together. A call graph from the first segment can be merged with a call graph from the second segment by inserting a common call element within sampled call data.

An embodiment may include a method for monitoring an application. A first thread may be sampled to generate a call data. An element may be inserted into the call data for the first thread. A second thread is sampled, such that the second thread asynchronous from the first thread. The second element is inserted into the call data for the second thread. The call data is merged for the first thread and the second thread.

An embodiment may include a system for monitoring a business transaction. The system may include a processor, a memory and one or more modules stored in memory and executable by the processor. When executed, the one or more modules may sample a first thread to generate a call data, insert an element into the call data for the first thread, sample a second thread, the second thread asynchronous from the first thread, insert the second element into the call data for the second thread, and merge the call data for the first thread and the second thread.

DETAILED DESCRIPTION

The present technology is able to discover and track business transactions that have two asynchronous segments. The segments may include a begin segment and an end segment and may execute on different threads of execution. A context object is used to determine an end segment for a start segment. A call element may be inserted into call graph to tie the call graph for the first segment and second segment together. A call graph from the first segment can be merged with a call graph from the second segment by inserting a common call element within sampled call data.

Figure 1:
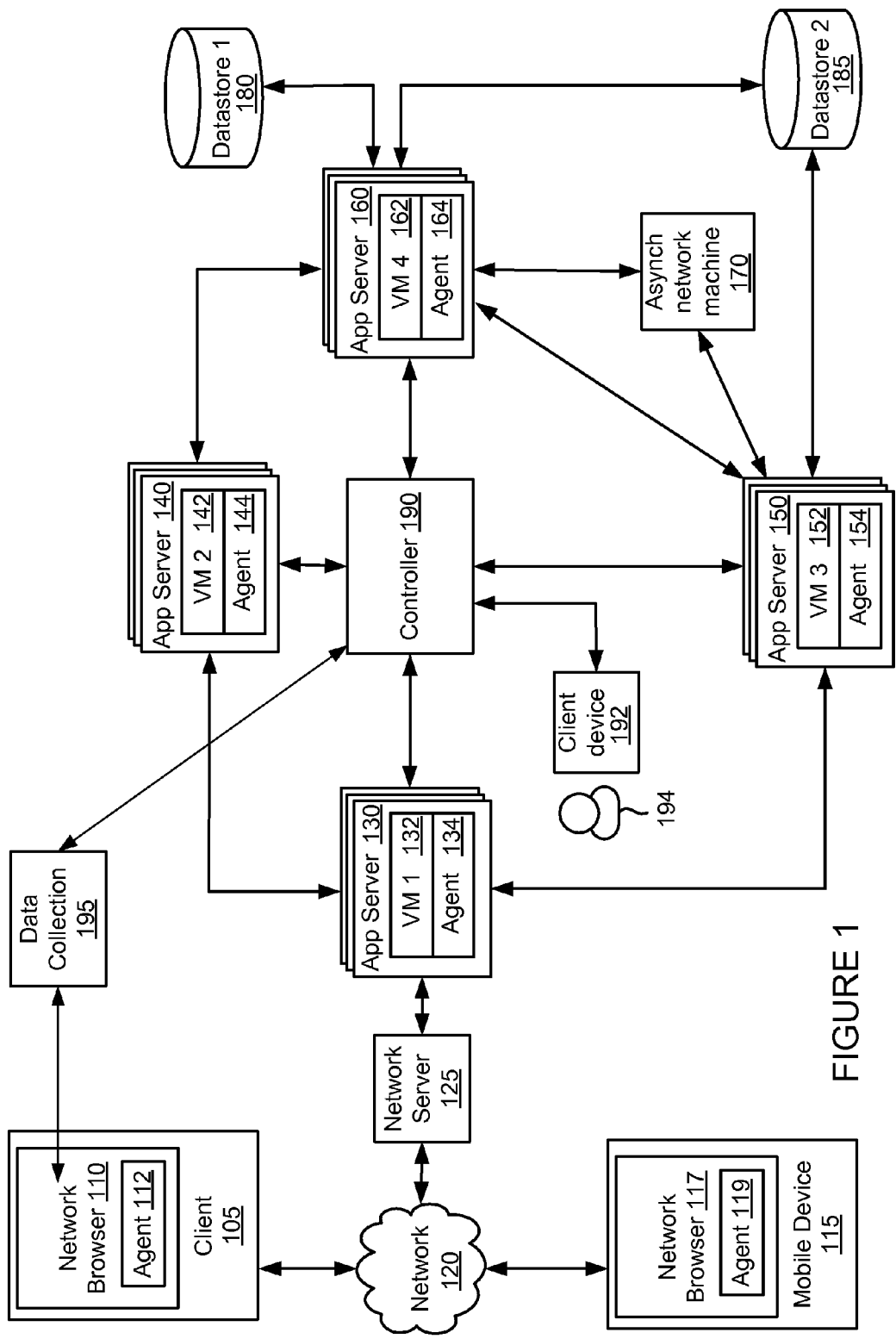
FIG. 1 is a block diagram of a system for monitoring a transaction.

FIG. 1 is a block diagram for monitoring a business transaction having asynchronous segments. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Application servers may or may not include virtual machines. For example, a .NET application server may not include a virtual machine and may be used in place of any application server 130-160 in the system of FIG. 1. References to a virtual machine for each application server are intended to be for exemplary purposes only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

In embodiments, application server 130 may include software other than virtual machines, such as for example one or more programs and/or modules that processes AJAX requests.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
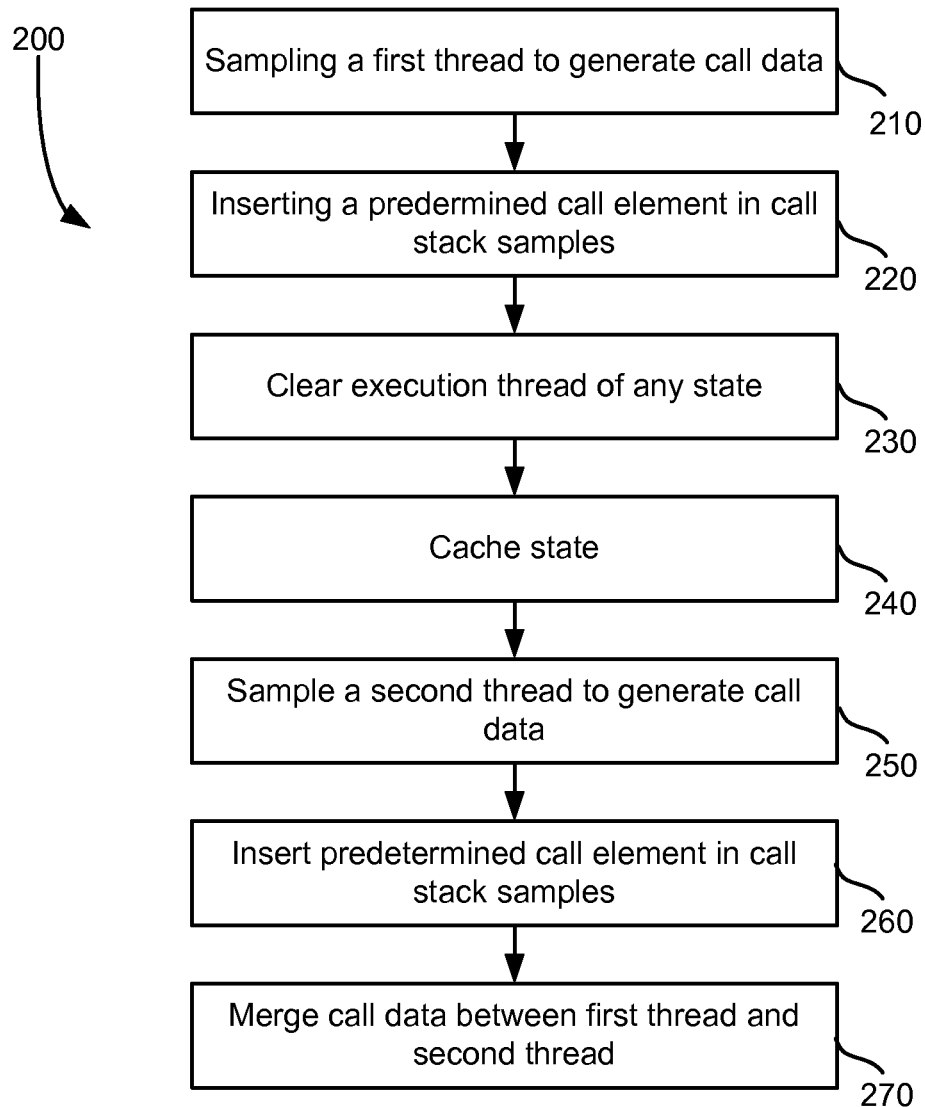
FIG. 2 is a method for monitoring a transaction.

FIG. 2 is a method for monitoring a transaction having asynchronous segments. First, a first thread is sampled to generate call data at step 210. Sampling the first thread may include identifying the method as a begin segment and extracting a context object from the begin segment. The context object will be used to tie the first thread to subsequent threads that are part of the same transaction. More detail for sampling a first thread is discussed with respect to the method of FIG. 3. After sampling a first thread to generate call data, a predetermined call element is inserted into the call stack samples at step 220. The predetermined call element insertion may involve inserting the call element before call stack elements which are not considered useful to a call graph. The call element may be inserted in all call stack samples until a root method ends. The root method may be, for example, "on method end." At this point, the beginning segment has ended.

The execution thread is then cleared of any state corresponding to the transaction at step 230. This ensures that no details will be left behind to obfuscate or effect any subsequent transaction monitoring. The state of the first segment is cached at step 240.

A second thread is sampled to generate call data at step 250. Sampling a second thread may include determining if it includes a content object that matches or is correlated to a context object of the first thread. Sampling a second thread to generate call data is discussed in more detail below with respect to the method of FIG. 4. After the second thread is sampled, the predetermined call element may be inserted in call stack samples at step 260. The call element inserted in the call stack samples at step 260 for the second thread is the same call stack element inserted into the samples of the first thread. The call element is inserted before call stack elements which are not desired by the administrator. The elements may be inserted in all stack samples until the non-desired method ends. Once the method ends, call data between the first thread and the second thread may be merged at step 270.

Figure 3:
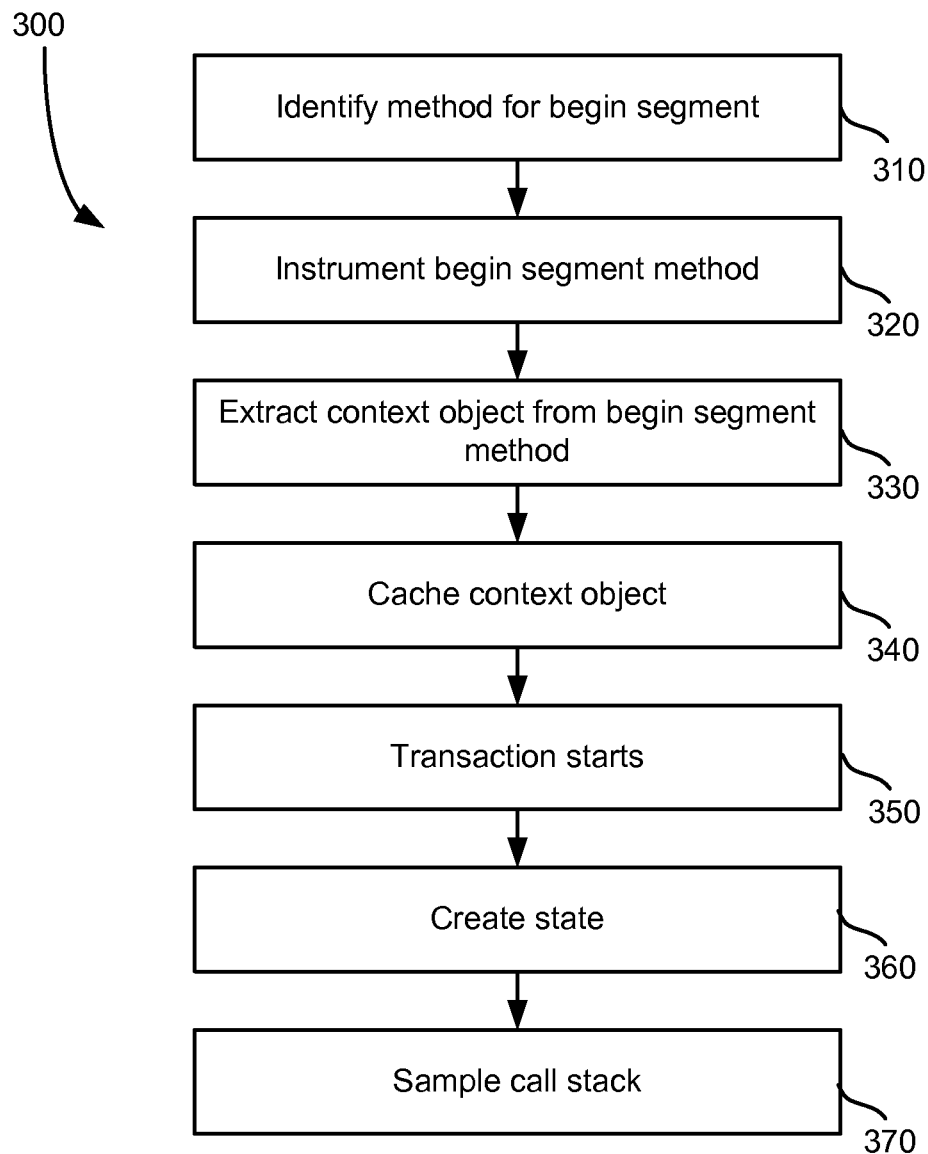
FIG. 3 is a method for sampling a first thread.

FIG. 3 is a method for sampling a first thread to generate call data. The method of FIG. 3 provides more detail for step 210 of the method of FIG. 2. First, a method is identified as a begin segment at step 310. The begin segment may then be instrumented at step 320. A context object may be extracted from the begin segment method at step 330. The context object may include a request object, session object, or some other object that will be common to the first segment and subsequent segment handled by a first thread and second thread, respectively, based on the framework or platform. The context object is cached at step 340. A transaction then starts at step 350 and a state is created at step 360. The call stack is then sampled at step 370.

Figure 4:
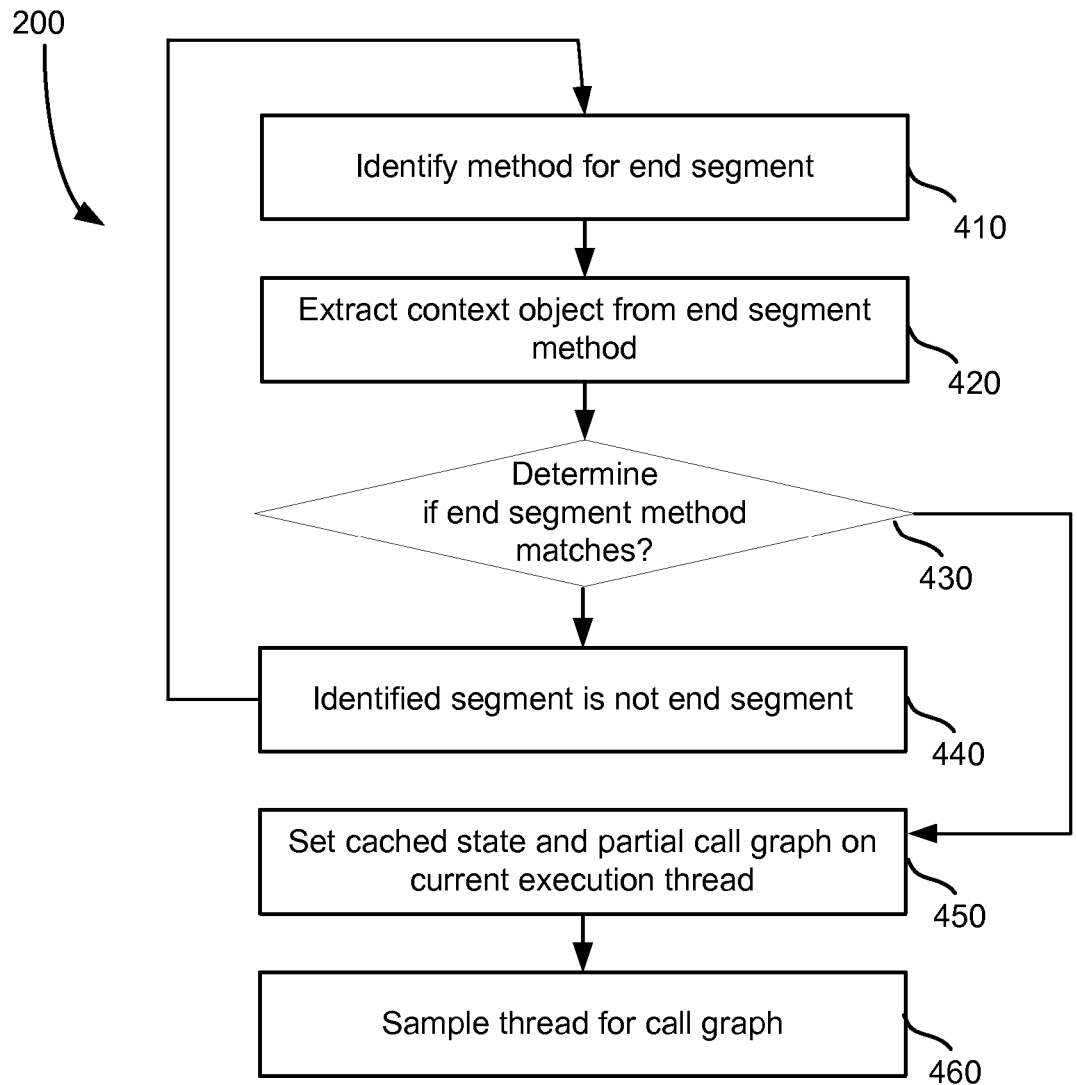
FIG. 4 is a method for monitoring a second thread as part of a transaction.

FIG. 4 is a method for sampling a second thread to generate call data. The method of FIG. 4 provides more detail for step 250 with the method of FIG. 2. First, a method for an end segment is identified at step 410. The potential end segment method is then analyzed to extract the content object from the end segment method. A determination is made as to whether the begin segment and end segment have a matching context object at step 430. If so, then the end segment and beginning segment are part of the same transaction and the call data should be merged. If not, the end segment is not monitored at step 440 and other segments may be analyzed to determine if they may be end segments at step 410.

An end segment having the same context object as the beginning segment of the first thread has its thread modified with the cached state and partial call graph stored after the first thread was monitored at step 450. The second thread for the end segment is then sampled for call graph data at step 460.

Figure 5:
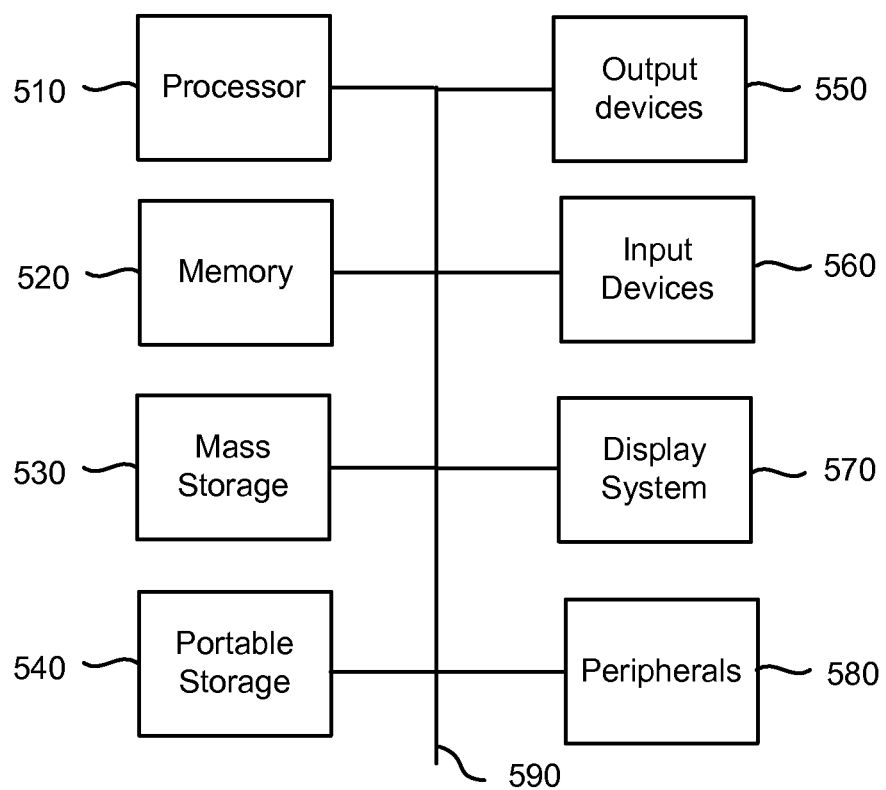
FIG. 5 is a block diagram of a computing environment for implementing the present technology.

FIG. 5 is a block diagram of a computing environment for implementing the present technology. System 500 of FIG. 5 may be implemented in the contexts of the likes of clients 105 and 192, network server 125, application servers 130-160, and data stores 190-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include an LED, liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring an application, comprising:
   sampling a first thread to identify a begin segment method executed by the first thread;
   extracting a context object from the begin segment;
   inserting the context object into a first set of call data for the first thread;
   sampling a second thread to identify an end method executed by the second thread, the second thread asynchronous form the first thread;
   extracting a second context object from the end segment method;
   reporting the first set of call data and a second set of call data to be merged based on the first context object and the second context object;
   setting a cached state and partial call graph from a previous thread on the current execution thread.

2. The method of claim 1, further comprising determining a second thread is an end segment for the first thread.

3. The method of claim 1, further comprising caching the context object for the first thread.

4. The method of claim 1, further comprising caching the call stack of the first thread.

5. The method of claim 1, wherein the element is placed in the call stack below a start thread.

6. The method of claim 1, further comprising:
determining that the first context object associated with the first thread matches the second context object associated with the second thread;
monitoring the second thread; and
inserting the context object into a second set of call data for the second thread.

7. A non-transitory computer readable storage medium having embodied thereon a program, the program being executable by a processor to perform a method for monitoring an application, the method comprising:
sampling a first thread to identify a begin segment method executed by the first thread;
extracting a context object from the begin segment;
inserting the context object into a first set of call data for the first thread;
sampling a second thread to identify an end segment executed by the second thread, the second thread asynchronous from the first thread;
extracting a second context object from the end segment; and
reporting the first set of call data and a second set of call data to be merged based on the first context object and the second context object;
setting a cached state and partial call graph from a previous thread on the current execution thread.

8. The non-transitory computer readable storage medium of claim 7, further comprising determining a second thread is an end segment for the first thread.

9. The non-transitory computer readable storage medium of claim 7, further comprising caching the context object for the first thread.

10. The non-transitory computer readable storage medium of claim 7, further comprising caching the call stack of the first thread.

11. The non-transitory computer readable storage medium of claim 7, wherein the element is placed in the call stack below a start thread.

12. The non-transitory computer readable storage medium of claim 7, further comprising:
determining that the first context object associated with the first thread matches the second context object associated with the second thread;
monitoring the second thread; and
inserting the context object into a second set of call data for the second thread.

13. A system for monitoring an application, comprising:
a processor;
a memory; and
one or more modules stored in memory and executable by a processor to sample a first thread to identify a begin segment method executed by the first thread
extract a context object from the begin segment,
insert the context object element into a first set of call data for the first thread,
sample a second thread to identify an end executed by the second thread, the second thread asynchronous from the first thread,
extract a second context object from the end segment; and
report the first set of call data and a second set of call data to be merged based on the first context object and the second context object;
setting a cached state and partial call graph from a previous thread on the current execution thread.

14. The system of claim 13, the one or more modules further executable to determine a second thread is an end segment for the first thread.

15. The system of claim 13, the one or more modules further executable to cache the context object for the first thread.

16. The system of claim 13, the one or more modules further executable to cache the call stack of the first thread.

17. The system of claim 13, wherein the element is placed in the call stack below a start thread.

18. The system of claim 13, the one or more modules further executable to determine that the first context object associated with the first thread matches the second context object associated with the second thread, monitor the second thread, and insert the context object into a second set of call data for the second thread.

* * * * *